(12) United States Patent
Lai

(10) Patent No.: US 8,113,346 B1
(45) Date of Patent: Feb. 14, 2012

(54) WATERPROOF MUSIC PLAYER STORAGE DEVICE

(76) Inventor: Deborah A. Lai, New Hyde Park, NH (US)

( * ) Notice: Subject to any disclaimer, the term of this patent is extended or adjusted under 35 U.S.C. 154(b) by 0 days.

(21) Appl. No.: 13/209,858

(22) Filed: Aug. 15, 2011

Related U.S. Application Data

(63) Continuation-in-part of application No. 12/855,166, filed on Aug. 12, 2010.

(51) Int. Cl.
  *B65D 85/00* (2006.01)
(52) U.S. Cl. .............................. 206/320; 220/8; 206/811
(58) Field of Classification Search ................. 206/320, 206/316.2; 381/87, 332, 334, 335, 336, 381, 381/386, 395; 181/198, 199; 396/25, 27; 312/205, 326, 329; 220/8
  See application file for complete search history.

(56) References Cited

U.S. PATENT DOCUMENTS

| | | | | |
|---|---|---|---|---|
| 1,184,525 | A * | 5/1916 | Hammond | ..................... 190/104 |
| 2,671,623 | A | 3/1954 | Toulmin, Jr. | |
| 3,378,134 | A * | 4/1968 | Wilkinson et al. | ........... 312/97.1 |
| 4,632,242 | A | 12/1986 | Choi et al. | |
| 4,663,621 | A | 5/1987 | Field et al. | |
| 4,906,058 | A | 3/1990 | Turner | |
| 5,503,571 | A | 4/1996 | Cheslock | |
| D371,479 | S | 7/1996 | Hirst | |
| 5,632,373 | A | 5/1997 | Kumar et al. | |
| 5,666,265 | A | 9/1997 | Lutz et al. | |
| 5,803,391 | A | 9/1998 | Saperstein et al. | |
| 6,435,390 | B1 * | 8/2002 | Abramowicz | ................. 224/629 |
| 6,954,405 | B2 | 10/2005 | Polany et al. | |
| 7,136,326 | B1 | 11/2006 | Smith | |
| 7,180,735 | B2 | 2/2007 | Thomas et al. | |
| 7,400,917 | B2 | 7/2008 | Wood et al. | |
| 2005/0014536 | A1 * | 1/2005 | Grady | ........................... 455/573 |
| 2005/0181745 | A1 | 8/2005 | Wood et al. | |
| 2005/0225288 | A1 | 10/2005 | Cole, Jr. et al. | |
| 2005/0280053 | A1 | 12/2005 | Hayes et al. | |
| 2007/0261978 | A1 * | 11/2007 | Sanderson | ..................... 206/320 |
| 2007/0280053 | A1 | 12/2007 | Polany et al. | |
| 2008/0165492 | A1 * | 7/2008 | Ward et al. | .................... 361/686 |
| 2009/0139990 | A1 * | 6/2009 | Bailis et al. | ..................... 220/212 |
| 2010/0200456 | A1 * | 8/2010 | Parkinson | ...................... 206/701 |

* cited by examiner

*Primary Examiner* — J. Gregory Pickett
*Assistant Examiner* — King M Chu

(57) ABSTRACT

A storage system having a housing divided into a first half housing telescopically received in a second half housing, the first and second half housing together form an inner cavity adapted to house a music player, the housing can move between at least a storage position and an extended position, the housing can be secured in the extended position via a securing means, doors pivotally placed in front panels of the housing which can each open and close for access to the inner cavity, a docking component adapted to operatively connect to a music player which is pivotally connected to a first bottom panel and can pivot about the pivot point between a first and second position, speakers in the housing which are operatively connected to the docking component, and a power source operatively connected to at least the speakers.

18 Claims, 4 Drawing Sheets

WATERPROOF MUSIC PLAYER STORAGE DEVICE

CROSS REFERENCE

This application is a continuation-in-part of U.S. patent application Ser. No. 12/855,166 filed Aug. 12, 2010, the disclosure of which is incorporated herein by reference in its entirety.

FIELD OF THE INVENTION

The present invention is directed to a storage system for a music player such as a MP3 player, more particularly to a waterproof storage system for such music players.

BACKGROUND OF THE INVENTION

Many individuals enjoy listening to music in the shower. The present invention features a novel waterproof storage system for music players. The system is collapsible for compact storage (e.g., during travel). The system may be sized to fit various music players including but not limited to small/medium/large MP3 players and other portable devices such as phones with music players included (e.g., iPhone®).

SUMMARY

The present invention features a waterproof music player storage system. In some embodiments, the music player storage system comprises a housing divided into a first half housing telescopically received in a second half housing, the first half housing and the second half housing together form an inner cavity adapted to house a music player, the housing can move between at least a storage position and an extended position, in the storage position the first half housing and the second half housing are compressed together and in the extended position the first half housing and the second half housing are separated a maximum distance allowing a music player to be housed in the inner cavity, the housing can be secured in the extended position via a securing means; a first door pivotally disposed in a first front panel of the first half housing, and a second door pivotally disposed in a second front panel of the second half housing, the doors can each move between at least an open position and a closed position respectively allowing and preventing access to the inner cavity of the housing; a docking component adapted to operatively connect to a music player, the docking component is pivotally connected to a first bottom panel of the first half housing via a pivot point, the docking component can pivot about the pivot point between a first position and a second position, in the first position the docking component is parallel with a length of the housing and in the second position the docking component is perpendicular to the length of the housing, the docking component can be temporarily secured in the first position via a swiveling holder; a speaker disposed in the housing, the speaker is operatively connected to the docking component; and a power source operatively connected to at least the speaker.

In some embodiments, the storage system is waterproof. In some embodiments, the housing of the storage system is generally rectangular or cylindrical in shape. In some embodiments, free ends of the doors face each other.

In some embodiments, the securing means comprises a peg and groove mechanism. In some embodiments, a spring-loaded peg is disposed on a first bottom panel of the first half housing at or near an inner end and a groove is disposed in a second bottom panel of the second half housing at or near an inner end, wherein the groove is adapted to receive the spring-loaded peg.

In some embodiments, the speaker includes at least a first speaker disposed in the first half housing and a second speaker disposed in the second half housing.

In some embodiments, the power source is a battery. In some embodiments, the power source is stored in a battery compartment disposed in the housing. In some embodiments, the battery compartment is disposed in the second back panel of the second half housing.

In some embodiments, the storage system further comprises bumpers disposed on each corner of the housing.

In some embodiments, the storage system further comprises a footing disposed on a bottom panel of the housing.

In some embodiments, the storage system further comprises a headphone jack operatively connected to the docking component, the headphone jack is adapted to engage headphones.

In some embodiments, the storage system further comprises a hanger disposed on the housing. In some embodiments, the hanger is slidably received in a slot disposed in a second top surface of the second half housing, the hanger can move between at least a storage position wherein the hanger is housed in the slot and an extended position wherein the hanger is pulled out of the slot and available for hanging purposes.

In some embodiments, the storage system further comprises an alarm clock. In some embodiments, a display is integrated into a door, the display displays at least time. In some embodiments, the storage system further comprises a time switch disposed on the housing and operatively connected, to the alarm clock, the time switch functions to change between regular time and military time displayed on the display.

In some embodiments, the storage system further comprises a power cord.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Referring now to FIGS. 1-6, the present invention features a waterproof storage system 100 for a music player such as an MP3 player or other portable device with music playing capabilities (e.g., mobile phones with music players included, e.g., iPhone®), etc.). The system 100 is collapsible for compact storage (e.g., during travel). The storage system 100 of the present invention can allow a user to play music in the shower. The storage system 100 may also allow a user to utilize the music player as an alarm clock. The storage system 100 is not limited to use in a shower but may be used for outdoor or travel purposes as well.

Figure 1:
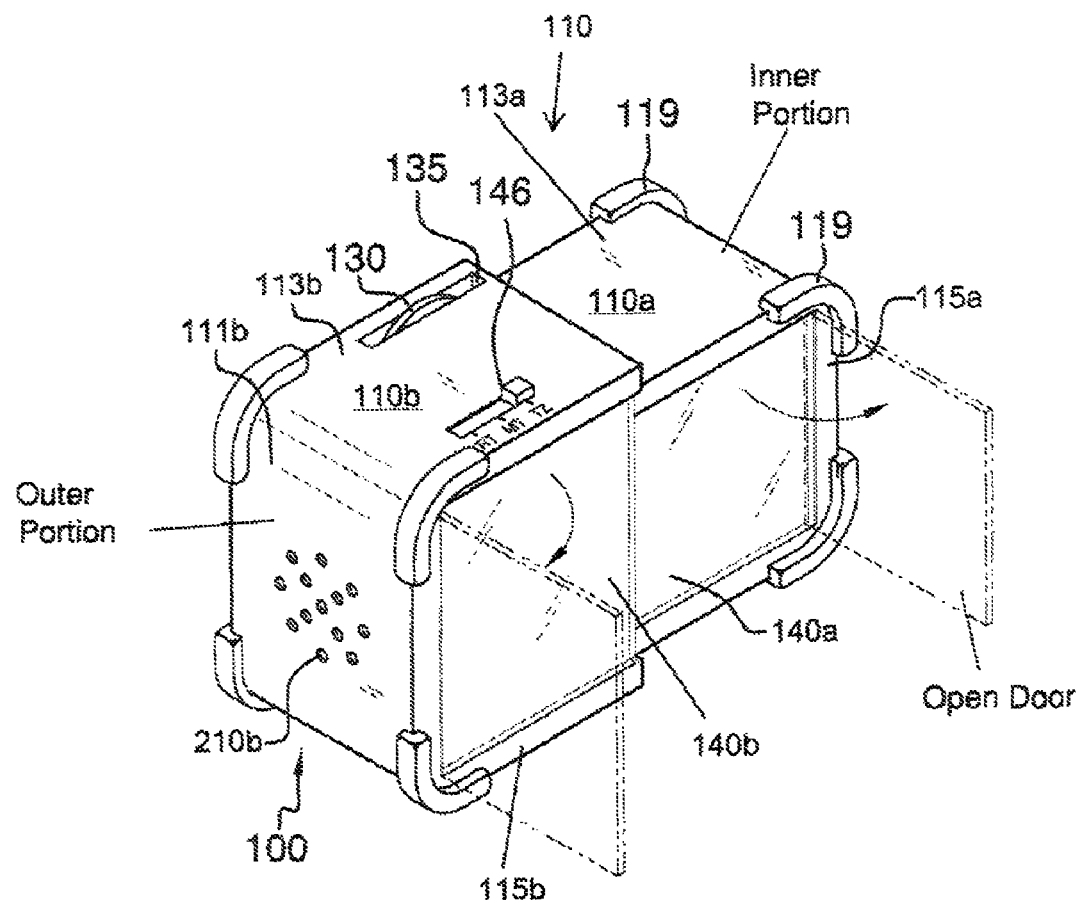
FIG. 1 is a top perspective view of the system of the present invention.
Figure 2:
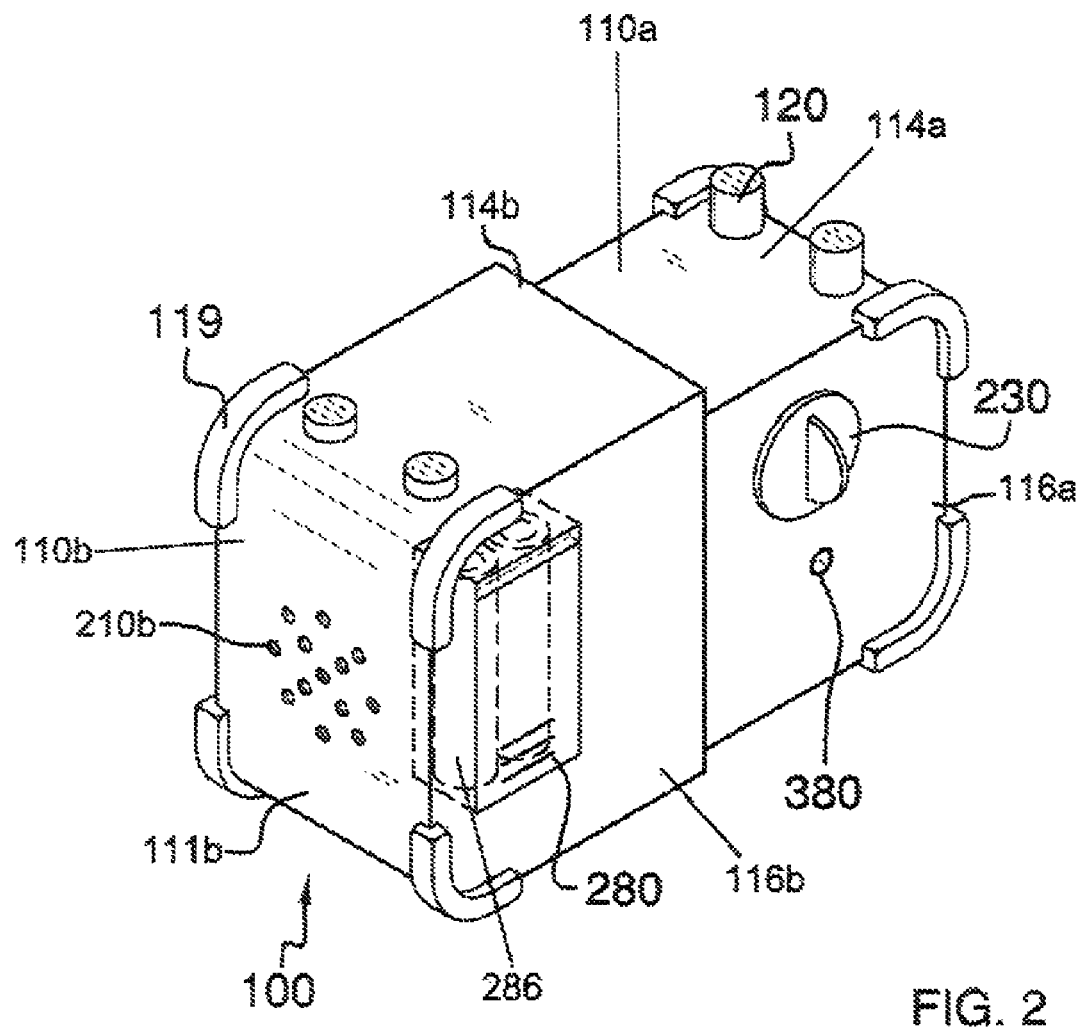
FIG. 2 is a bottom perspective view of the system of FIG. 1.

The storage system 100 of the present invention comprises a housing 110 divided into a first half housing 110a telescopically received in a second half housing 110b. Together, the half housings 110a, 110b forms an inner cavity adapted to house a music player. The first half housing 110a has a first side panel 111a, a first top panel 113a, a first bottom panel 114a, a first back panel 116a, and a first front panel 115a. The second half housing 110b has a second side panel 111b, a second top panel 113b, a second bottom panel 114b, a second back panel 116b, and a second front panel 115b. In some embodiments, the housing 110 is generally rectangular (e.g., rounded rectangular as shown in FIG. 1, e.g., with curved and rounded edges). The housing 110 may be constructed in a variety of other shapes, e.g., a cylindrical shape.

In some embodiments, bumpers 119 (e.g., rubber bumpers) are disposed on one or more (e.g., each) corners of the housing 110. In some embodiments, one or more footings 120 disposed on the bottom of the housing 110 (e.g., the first bottom panel, the second bottom panel). The footings may help the housing 110 remain stable and help prevent the housing 110 from slipping when placed on a surface (e.g., a shower ledge). In some embodiments, the footings 120 on the first half housing 110a may be longer in length than the footings 120 on the second half housing 110b (e.g., see FIG. 2).

In some embodiments, a hanger 130 is disposed on the housing 110, allowing the housing 110 to be hung. In some embodiments, the hanger 130 is a hook (see FIG. 6), a dip, a loop, the like, or a combination thereof. In some embodiments, the hanger 130 is disposed on the back of the housing, e.g., the second back surface 116b. In some embodiments, the hanger 130 is slidably received in a slot 135 disposed in the second top surface 113b of the housing 113. The hanger 130 can move between multiple positions including but not limited to a storage position (see FIG. 1) wherein the hanger 130 is housed in the slot 135 and an extended position (see FIG. 6), wherein the hanger 130 is pulled out of the slot 135 and available for hanging purposes.

As shown in FIG. 1, a first door 140a is pivotally disposed in the first front panel 115a of the first half housing 110a, and a second door 140b is pivotally disposed in the second front panel 115b of the second half housing 110b. The free ends of the doors 140 may face each other. The doors 140 can each move between at least an open position and a closed position respectively allowing and preventing access to the inner cavity of the housing 110. In some embodiments, one or more gaskets 410 are disposed in the housing 110 for helping to provide a water-tight seal. For example, gaskets may surround the doors 140 to help maintain a water-tight seal between the doors 140 and the front panels 115 of the housing 110. In some embodiments, the doors 140 are constructed from a material comprising a transparent plastic.

Disposed in the housing 110 are one or more speakers 210, e.g., waterproof speakers. In some embodiments, a first speaker 210a (e.g., waterproof speaker) is disposed in the first half housing 110a, for example on or in the first side panel 111 of the first half housing 110a. In some embodiments, a second speaker 210b (e.g., waterproof speaker) is disposed in the second half housing 110b, for example on or in the second side panel 111b of the second half housing 110b. The speakers 210 are operatively connectable to the music player to allow the music to be heard. The speakers of the system 100 of the present invention are designed to provide extremely high quality sound. Speakers, e.g., waterproof speakers, are well known to one of ordinary skill in the art.

The speakers 210 are operatively connected to a power source. In some embodiments, the power source is a battery 286 (e.g., rechargeable battery). In some embodiments, a battery compartment 280 for housing the battery 286 (e.g., rechargeable battery) is disposed in the housing 110, for example at the back panel 116 of the second half housing 110 (see FIG. 2).

Figure 3:
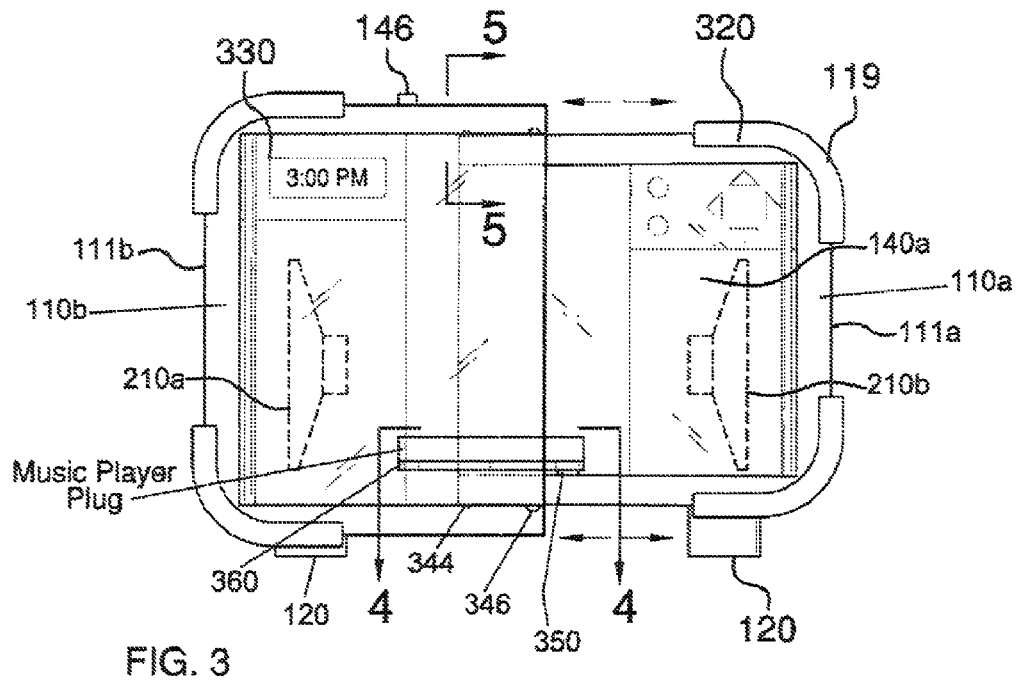
FIG. 3 is a front and internal view of the system of FIG. 1.
Figure 4:
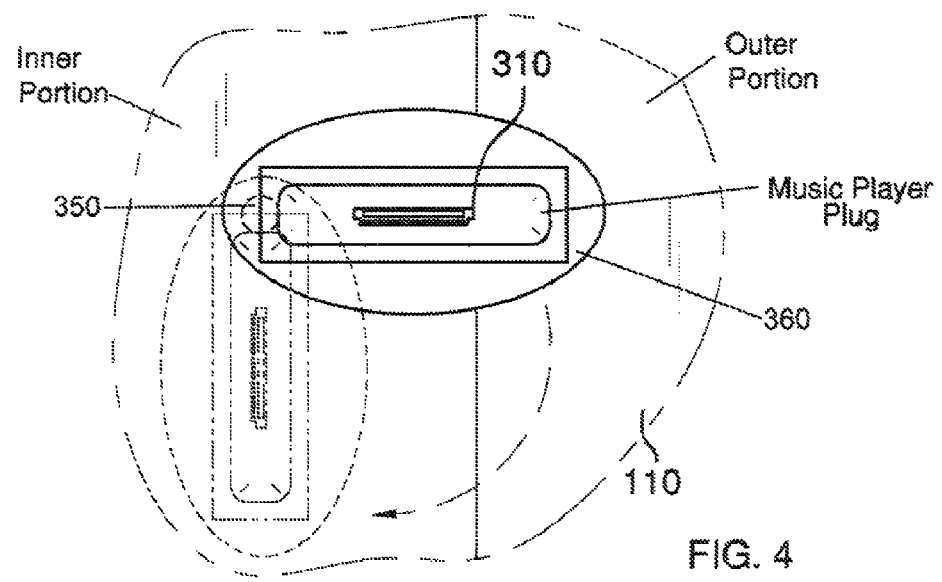
FIG. 4 is a top view of the docking component of the system of FIG. 3.
Figure 5:
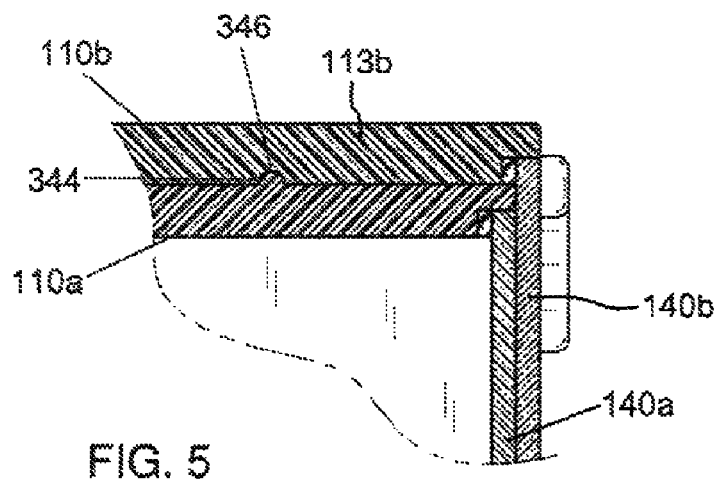
FIG. 5 is a side cross sectional view of the system of FIG. 3.
Figure 6:
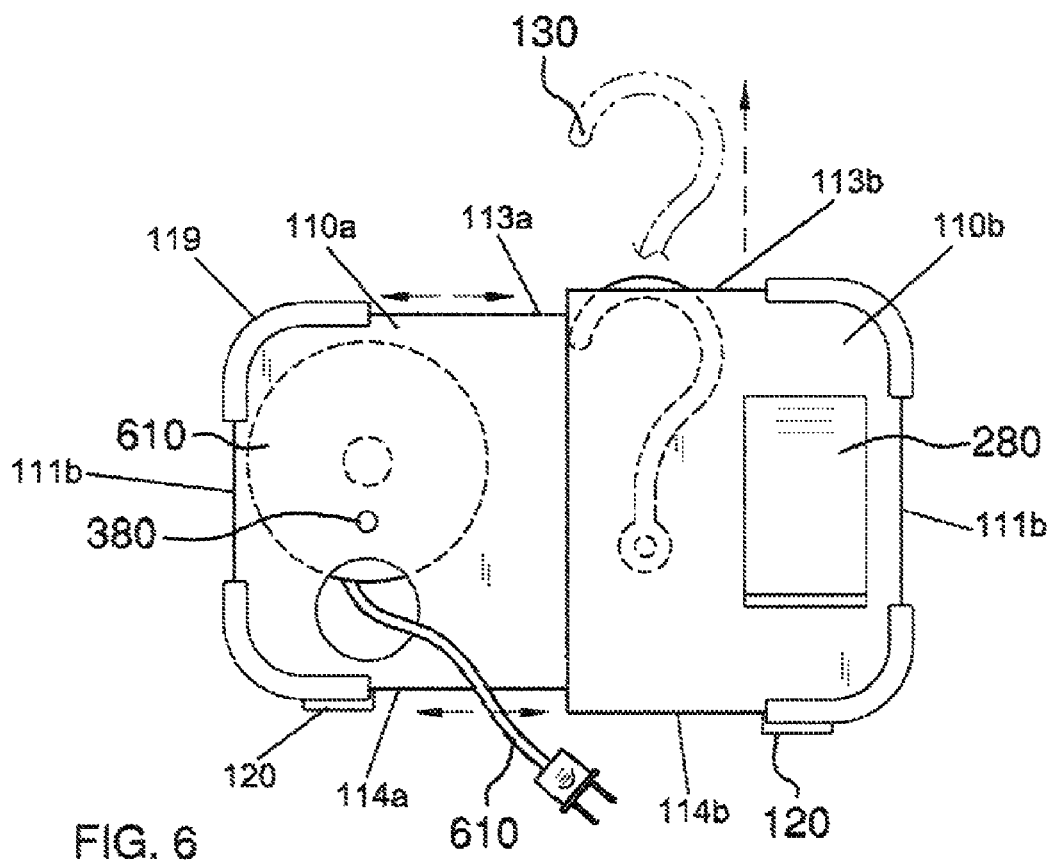
FIG. 6 is a back and internal view of the system of FIG. 1.

The housing 110 can move between at least a storage position wherein the first half housing 110a and the second half housing 110b are compressed together, and an extended position wherein the first half housing 110a and the second half housing 110b are separated a maximum distance allowing a music player to be housed in the inner cavity. In the extended position, the inner cavity is sealed, for example the housing prevents water from entering into the inner cavity. The housing can be secured in the extended position via a securing means. In some embodiments, the securing means comprises a peg and groove mechanism. Peg and groove mechanisms are well known to one of ordinary skill in the art. For example, as shown in FIG. 3 and FIG. 5, a spring-loaded peg 344 is disposed on the first bottom panel 114a of the first half housing 110a (at or near the inner end) and a groove 346 is disposed in the second bottom panel 114b of the second half housing 110b (at or near the inner end), wherein the groove 346 is adapted to receive the spring-loaded peg 344. In some embodiments, multiple grooves 346 are disposed in the second bottom panel 114b of the second half housing 110b. When the housing is in the storage position, the spring-loaded peg is not engaged in the groove 346. When the housing 110 is in the extended position, the spring-loaded peg 344 is engaged in the groove 346. The securing means is not limited to a peg and groove mechanism. For example, in some embodiments, the securing means is a latch mechanism, a magnet mechanism, the like, or a combination thereof.

Disposed inside the housing 110 is a docking component 310 (e.g., a music player plug) engaging the music player. Docking components are well known to one of ordinary skill in the art. The docking component 310 is operatively connected to the speakers 210. The docking component 310 is pivotally connected to the first bottom panel 114a of the first half housing 110a via a pivot point 350. The docking component 310 can pivot about the pivot point 350 between a first position and a second position. In the first position, the docking component 310 is parallel with the length of the housing 110, for example the ends of the docking component 310 face the first side panel 111a and the second side panel 111b of the housing 110. In the second position (e.g., a storage position), the docking component 310 is perpendicular to the length of the housing 110, for example the ends of the docking component 310 face the front panels 115 and the back panels 116 of the housing 110. The docking component 310 can be temporarily secured in the first position via a swiveling holder 360.

In some embodiments, one or more adapters may be used in combination with the docking component 310 to allow different types of music players to be used inside the storage system 100 of the present invention.

In some embodiments, the system 100 of the present invention further comprises an alarm clock. Alarm clocks are well known to one of ordinary skill in the art. For example, in some embodiments, a display 330 (e.g., light emitting diode (LED) display) is integrated into a door 140, e.g., the first door 140a or the second door 140b. The display 330 may display the time. In some embodiments, the display 330 displays other information such as the alarm setting, the music being played, or other information. In some embodiments, a control panel 320 is integrated into a door 140, e.g., the first door 140a or the second door 140b, wherein the control panel 320 comprises control buttons for setting the time or setting an alarm. In some embodiments, the control panel 320 comprises buttons for playing music on the music player (e.g., a play button, a pause button, a stop button, a seek button). In some embodiments, the system 100 comprises a time switch 146 disposed on the housing 110 operatively connected to the alarm dock. The time switch 146 functions to change time from regular time to military time, and optionally change time zones (e.g., daylight saving time, standard time).

In some embodiments, the docking component 130 operatively connected to the control panel 320. In some embodiments, the docking component 130 operatively connected to the display 330.

In some embodiments, the system 100 of the present invention further comprises a power cord 610 (e.g., a spring-loaded retractable power cord). Such power cords are well known to one of ordinary skill in the art. In some embodiments, the power cord 610 is disposed in a back panel 116 of the housing 110, for example the first back panel 116a of the first half housing 110a. In some embodiments, the power cord 610 can retract completely into the housing 110. In some embodiments, a cap 230 removably covers the area that the power cord 610 extends from or retracts into the back panel 116 of the housing 110 (see FIG. 2). A user can use the power cord 610 in between uses to charge the battery, for example if the battery is a rechargeable battery.

In some embodiments, a headphone jack 380 (e.g., a waterproof headphone jack) is disposed in the housing 110, for example in the second back panel 116b of the second half housing 110b. The headphone jack 380 can operatively connect a set of headphones (e.g., waterproof headphones) to the music player. This allows a user to listen to the music with headphones rather than the speakers. The headphone jack 380 is waterproof such that even when headphones are not engaged water cannot penetrate into the inner cavity of the housing 110.

The system 100 of the present invention may be constructed from a variety of materials. For example, in some embodiments, the housing 110 is constructed from a material comprising plastic, rubber, metal, the like, or a combination thereof. In some embodiments, the housing 110 is constructed from a material comprising silicone rubber.

The system 100 may be constructed in a variety of sizes. In some embodiments, the housing is between about 2 to 4 inches in height as measured from the first top panel 113a to the first bottom panel 114a. In some embodiments, the housing is between about 4 to 6 inches in height as measured from the first top panel 113a to the first bottom panel 114a. In some embodiments, the housing is between about 6 to 8 inches in height as measured from the first top panel 113a to the first bottom panel 114a.

In some embodiments, the housing 110 is between about 2 to 4 inches in width as measured from the first front panel 115a to the first back panel 116a. In some embodiments, the housing 110 is between about 4 to 6 inches in width as measured from the first front panel 115a to the first back panel 116a. The present invention is not limited to the aforementioned dimensions.

As used herein, the term "about" refers to plus or minus 10% of the referenced number. For example, an embodiment wherein the housing 110 is about 5 inches in width includes a housing 110 that is between 4.5, and 5.5 inches in width.

In some embodiments, the storage system 100 of the present invention is designed to be shockproof, for example the storage system 100 can resist damage from dropping or mishandling. Mechanisms for shock-proofing electronic equipment are well known to one of ordinary skill in the art.

The disclosures of the following U.S. patents are incorporated in their entirety by reference herein: U.S. Pat. No. 4,906,058; U.S. Pat. No. 6,954,405; U.S. Pat. No. 7,180,735; U.S. Pat. Application No. 2005/0225288; U.S. Pat. Application No. 2005/0181745.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A storage system comprising:
   (a) a housing (110) divided into a first half housing (110a) telescopically received in a second half housing (110b), the first half housing (110a) and the second half housing (110b) together form an inner cavity adapted to house a music player, the housing (110) can move between at least a storage position and an extended position, in the storage position the first half housing (110a) and the second half housing (110b) are compressed together and in the extended position the first half housing (110a) and the second half housing (110b) are separated a maximum distance allowing a music player to be housed in the inner cavity, the housing (110) can be secured in the extended position via a securing means;
   (b) a first door (140a) pivotally disposed in a first front panel (115a) of the first half housing (110a), and a second door (140b) pivotally disposed in a second front panel (115b) of the second half housing (110b), the doors (140) can each move between at least an open position and a closed position respectively allowing and preventing access to the inner cavity of the housing (110);
   (c) a docking component (310) adapted to operatively connect to a music player, the docking component (310) is pivotally connected to a first bottom panel (114a) of the first half housing (110a) via a pivot point (350), the docking component (310) can pivot about the pivot point (350) between a first position and a second position, in the first position the docking component (310) is parallel with a length of the housing (110) and in the second position the docking component (310) is perpendicular to the length of the housing (110), the docking component (310) can be temporarily secured in the first position via a swiveling holder (360);
   (d) a speaker (210) disposed in the housing (110), the speaker (210) is operatively connected to the docking component (310); and
   (e) a power source operatively connected to at least the speaker (210), wherein the system (100) is waterproof.

2. The system (100) of claim 1, wherein housing is generally rectangular or cylindrical in shape.

3. The system (100) of claim 1, wherein free ends of the doors (140) face each other.

4. The system (100) of claim 1, wherein the securing means comprises a peg and groove mechanism.

5. The system (100) of claim 4, wherein a spring-loaded peg (344) is disposed on a first bottom panel (114a) of the first half housing (110a) at or near an inner end and a groove (346) is disposed in a second bottom panel (114b) of the second half housing (110b) at or near an inner end, wherein the groove (346) is adapted to receive the spring-loaded peg (344).

6. The system (100) of claim 1, wherein the speaker (210) includes at least a first speaker (210a) disposed in the first half housing (110a) and a second speaker (210b) disposed in the second half housing (110b).

7. The system (100) of claim 1, wherein the power source is a battery (286).

8. The system (100) of claim 1, wherein the power source is stored in a battery compartment (280) disposed in the housing (110).

9. The system (100) of claim 8, wherein the battery compartment (280) is disposed in the second back panel (116b) of the second half housing (110b).

10. The system (100) of claim 1 further comprising bumpers (119) disposed on each corner of the housing (110).

11. The system (100) of claim 1 further comprising a footing (120) disposed on a bottom panel of the housing (110).

12. The system (100) of claim 1 further comprising a headphone jack (380) operatively connected to the docking component (310), the headphone jack (380) is adapted to engage headphones.

13. The system (100) of claim 1 further comprising a hanger (130) disposed on the housing (110).

14. The system (100) of claim 13, wherein the hanger (130) is slidably received in a slot (135) disposed in a second top surface (113b) of the second half housing (110b), the hanger (130) can move between at least a storage position wherein the hanger (130) is housed in the slot (135) and an extended position wherein the hanger (130) is pulled out of the slot (135) and available for hanging purposes.

15. The system (100) of claim 1 further comprising an alarm clock.

16. The system (100) of claim 15, wherein a display (330) is integrated into a door (140), the display (330) displays at least time.

17. The system (100) of claim 16 further comprising a time switch (146) disposed on the housing (110) and operatively connected to the alarm clock, the time switch (146) functions to change between regular time and military time displayed on the display (330).

18. The system (100) of claim 1 further comprising a power cord (610).

* * * * *